US012060734B2

(12) United States Patent
Levien et al.

(10) Patent No.: US 12,060,734 B2
(45) Date of Patent: Aug. 13, 2024

(54) DEVICE AND METHOD FOR RESTRAINING THE WRISTS OF A SUBJECT

(71) Applicant: Paratin Corporation, Brampton (CA)

(72) Inventors: Christien Levien, Brampton (CA); Chris Daniel, Whitby (CA)

(73) Assignee: Paratin Corporation, Brampton (CA)

( * ) Notice: Subject to any disclaimer, the term of this patent is extended or adjusted under 35 U.S.C. 154(b) by 375 days.

(21) Appl. No.: 17/374,419

(22) Filed: Jul. 13, 2021

(65) Prior Publication Data

US 2022/0010596 A1 Jan. 13, 2022

Related U.S. Application Data

(60) Provisional application No. 63/051,123, filed on Jul. 13, 2020.

(51) Int. Cl.
*E05B 75/00* (2006.01)

(52) U.S. Cl.
CPC .................................... *E05B 75/00* (2013.01)

(58) Field of Classification Search
CPC ........................................................ E05B 75/00
See application file for complete search history.

(56) References Cited

U.S. PATENT DOCUMENTS 5,159,728 A * 11/1992 Bingold .................. E05B 75/00 D8/394
5,377,510 A * 1/1995 Smith ..................... E05B 75/00 128/878
5,398,383 A * 3/1995 Bingold .................. E05B 75/00 24/16 PB
5,802,888 A * 9/1998 Parsons ................... E05B 75/00 24/16 PB
7,866,321 B2 * 1/2011 DePetrillo ............... E05B 75/00 128/878
8,336,345 B2 * 12/2012 Burgoon ................ E05B 75/00 70/17
8,353,183 B1 * 1/2013 Lofgren .................. E05B 75/00 70/16
8,539,798 B2 * 9/2013 Harrington ............. E05B 75/00 24/17 AP
9,328,539 B1 * 5/2016 Lonardo ................. E05B 75/00
11,236,531 B2 * 2/2022 Parsons ................... E05B 75/00
2014/0131435 A1 * 5/2014 Harrington ............. E05B 75/00 235/375

* cited by examiner

*Primary Examiner* — Christopher J Boswell
(74) *Attorney, Agent, or Firm* — Own Innovation; James W. Hinton

(57) ABSTRACT

A restraint device and associated method for securing the wrists of a subject, the device comprising a first wrist restraint and a second wrist restraint, each wrist restraint having a loop with a variable circumference, wherein each wrist restraint transitions between an inserting configuration, and a secure configuration, wherein the circumference of the loop in the inserting configuration is greater than the circumference of the loop in the secure configuration, and a cinching portion couplable to each wrist restraint to removably attach the first wrist restraint and the second wrist restraint, wherein upon increasing a distance between a first wrist of the subject inserted into the loop of the first wrist restraint, and a second wrist of the subject inserted into the loop of the second wrist restraint, the restraint device transitions from the inserting configuration to the secure configuration.

16 Claims, 13 Drawing Sheets

DEVICE AND METHOD FOR RESTRAINING THE WRISTS OF A SUBJECT

TECHNICAL FIELD

The following relates generally to devices and methods for restraining the hands and wrists of a person, and more particularly to devices and methods for enabling individuals to self-administer hand and wrist restraints.

INTRODUCTION

Hand restraints such as handcuffs are used to help restrain an individual (hereafter called subject) during detainment, arrest or prisoner transfer. These restraints generally come in two forms, a pair of hinged locking metal cuffs or an elongated flexible chord loop which can be cinched close in much the same manner as a pull tie. Numerous variations of these designs are available on the market.

In the case hinged cuffs, the officer opens each of the cuffs and places each of the subject's hands into the cuffs before locking them. In the case of the pull tie design, the officer places the subject's hands into the flexible loop (or loops) and then the officer cinches the loop to restrain the subject's hands. In each of these types of designs, the officer places the subject's hands in the restraint (oftentimes by force) and then the officer physically engages the locking mechanism to restrain the subject's hands.

In the case where the subject is cooperative, the subject can assist the officer by holding still while the officer applies the hand restraints. The act of restraining the subject is carried out by the officer, not by the subject. The process of the officer applying the restraint can be difficult and does not facilitate the subject's cooperation. It is possible for the officer to apply the restraints too tightly causing pain and discomfort to the subject. It is also possible that the very act of applying the restraints can be traumatic to the subject causing the subject to become uncooperative. Accordingly, a new type of hand restraint which is less traumatic to the subject is therefore desirable.

SUMMARY

This summary is intended to introduce the reader to various aspects of the applicant's teaching, but not to define any specific embodiments. In general, disclosed herein are one or more restraint devices and associated methods for securing the wrists of a subject.

In a first aspect, the restraint device comprises a first wrist restraint and a second wrist restraint, each wrist restraint having a loop with a variable circumference, wherein each wrist restraint transitions between an inserting configuration, and a secure configuration, wherein the circumference of the loop in the inserting configuration is greater than the circumference of the loop in the secure configuration, and a cinching portion couplable to each wrist restraint to removably attach the first wrist restraint and the second wrist restraint, wherein upon increasing a distance between a first wrist of the subject inserted into the loop of the first wrist restraint, and a second wrist of the subject inserted into the loop of the second wrist restraint, the restraint device transitions from the inserting configuration to the secure configuration.

According to some examples, each wrist restraint comprises a first end comprising a first ratcheting mechanism and a second end insertable into the first ratcheting mechanism to form the loop of each wrist restraint, wherein the first ratcheting mechanism is configured to only decrease the circumference of the loop to transition the restraint device from the inserting configuration to the secure configuration.

According to some examples, the cinching portion comprises a cinching ratcheting mechanism through which the second end of each wrist restraint is passed in opposing directions such that the second end of each wrist restraint may only advance through the cinching ratcheting mechanism in one direction once engaged by the cinching ratcheting mechanism.

According to some examples, the first end of each wrist restraint further comprises a second ratcheting mechanism, configured to receive the second end of the other wrist restraint.

According to some examples, each wrist restraint further comprises a locking mechanism, wherein each second ratcheting mechanism may be enabled by locking the locking mechanism, fixing the circumference of each loop, when the second end of each wrist restraint is inserted into the second ratcheting mechanism of the other wrist restraint.

According to some examples, each locking mechanism comprises a pin, wherein removing the pin locks the locking mechanism.

According to some examples, the restraint further comprises a loosening mechanism, wherein when each loosening mechanism is engaged, each first ratcheting mechanism is disabled, such that each wrist restraint may be transitioned from the secure configuration to the inserting configuration.

According to some examples, each wrist restraint is constructed of a semi-rigid polymer material.

According to some examples, wrist restraint is constructed of metal.

In another aspect, some examples of the invention provide a method of operating a restraint device, the method comprising the steps of: forming the loop of each wrist restraint by inserting the second end of each wrist restraint into the first ratcheting mechanism of the same wrist restraint, and coupling each wrist restraint to the cinching portion by inserting the second end of each wrist restraint into the cinching ratcheting mechanism, thereby placing the restraint device in the inserting configuration.

According to some examples, the method comprises inserting the first wrist of the subject into the loop of the first wrist restraint, and inserting the second wrist of the subject into the loop of the second wrist restraint, increasing the distance between the first wrist and the second wrist to transition the restraint device to the secure configuration, and decreasing the distance between the first wrist and the second wrist to secure the subject's wrists.

According to some examples, the method comprises a second ratcheting mechanism at the first end of each wrist restraint, wherein the second ratcheting mechanism of each wrist restraint is configured to receive the second end of the other wrist restraint, and a locking mechanism, wherein the second ratcheting mechanism may be enabled by locking the locking mechanism, fixing the circumference of each wrist restraint, wherein the method further comprises inserting the second end of each wrist restraint into the second ratcheting mechanism of the other wrist restraint, and locking the locking mechanism to fix the circumference of each wrist restraint.

According to some examples, each locking mechanism comprises a pin, wherein locking the locking mechanism comprises removing each pin.

According to some examples, each pin when removed, mechanically biases the second ratcheting mechanism such that the second ratcheting mechanism cannot engage the second end of the wrist restraint.

According to some examples, each wrist restraint further comprises a loosening mechanism, wherein when each loosening mechanism is engaged, each first ratcheting mechanism is disabled. The method further comprises engaging the loosening mechanism to disable the first ratcheting mechanism, transitioning the wrist restraint from the secure configuration to the inserting configuration.

In another aspect, the restraint device comprises a first wrist restraint and a second wrist restraint, each wrist restraint having a loop with a circumference, wherein each wrist restraint comprises an inserting configuration, and a secure configuration, wherein the circumference of the inserting configuration is greater than the circumference of the secure configuration, a cinching portion coupled to each wrist restraint, the cinching portion configured such that while the subject's first wrist is inserted into the loop of the first wrist restraint and the subject's second wrist is inserted into the opening of the second wrist restraint, a subject may engage a member of the cinching portion to move each wrist restraint from the inserting configuration to the secure configuration.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Referring now to FIGS. 1-4, shown therein is a restraint device 100, according to an embodiment. The restraint device 100 comprises a first wrist restraint 102*a* and a second wrist restraint 102*b* for restraining the writs of the subject (not shown). In the embodiment shown in FIGS. 1-4, the first wrist restraint 102*a* and second wrist restraint 102*b* are identical. According to other embodiments (not shown), the first wrist restraint 102*a* and the second wrist restraint 102*b* may differ. For example, the first wrist restraint 102*a* may be designed to be placed on the left wrist of a subject, while the second wrist restraint 102*b* may be designed to be placed on the right wrist of a subject.

Each wrist restraint 102*a*, 102*b* may be a zip tie, pull tie or cable tie. Each wrist restraint 102*a*, 102*b* comprises a strip like body 104*a*, 104*b*, comprising a first end 106*a*, 106*b* and second end 108*a*, 108*b*. The body 104*a*, 104*b* comprises a plurality of ridge features 110*a*, 110*b*, which may provide a surface such that the body may frictionally engage with other components, for example, a pawl of a ratchet mechanism.

Figure 1:
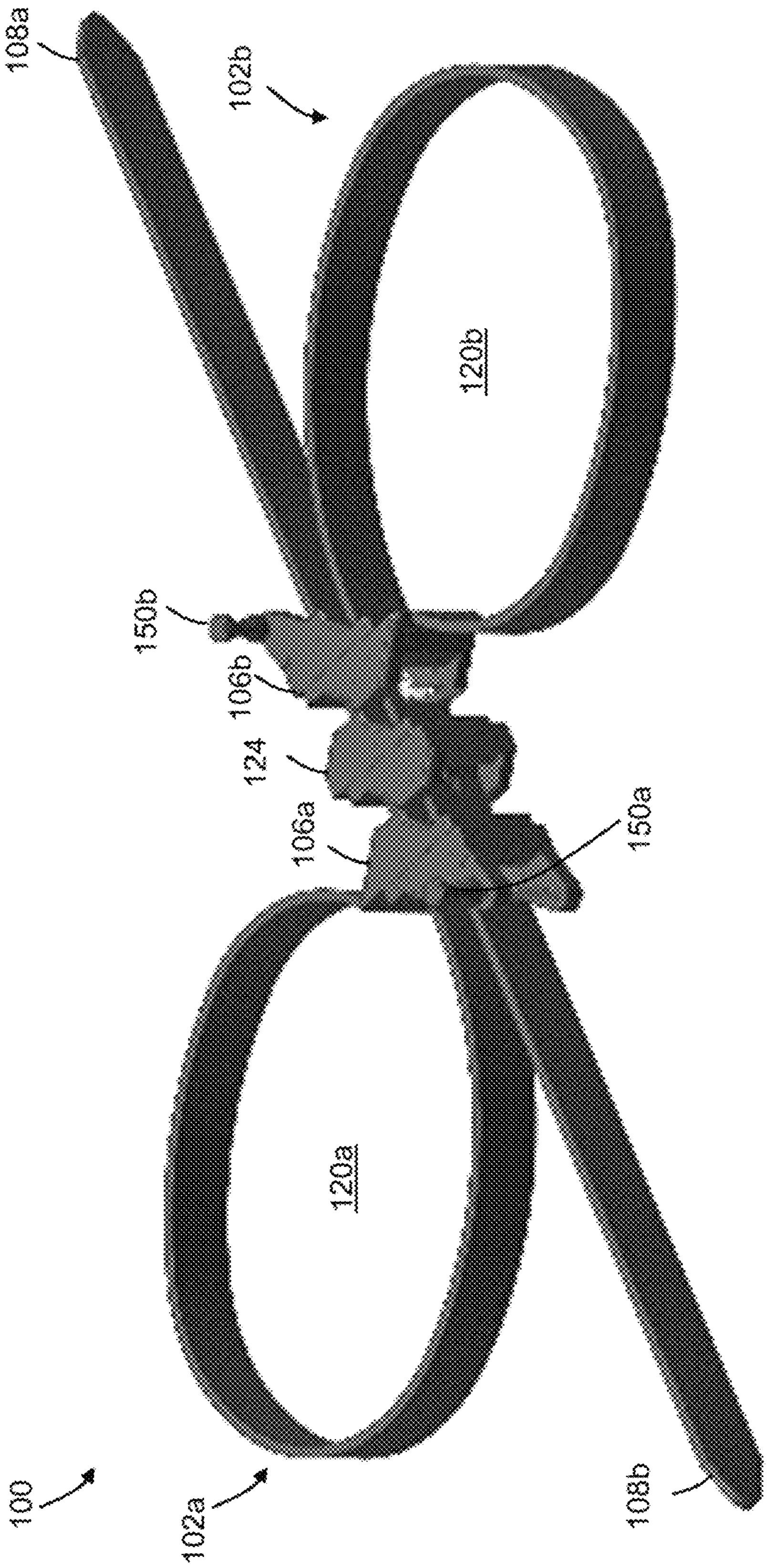
FIG. 1 is a perspective view of an example embodiment of a restraint device.
Figure 2:
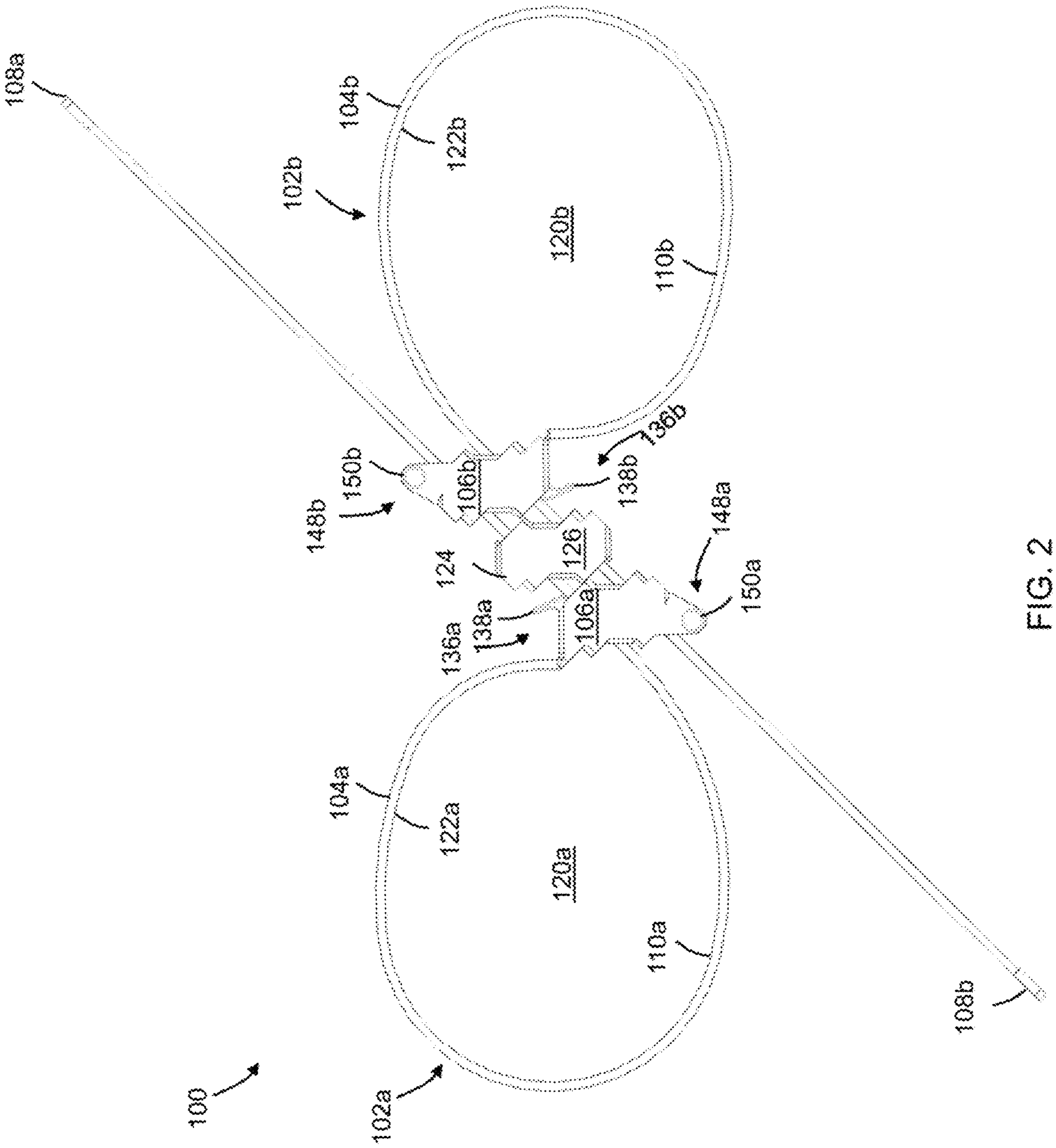
FIG. 2 is a plan view of the restraint device of FIG. 1.
Figure 3:
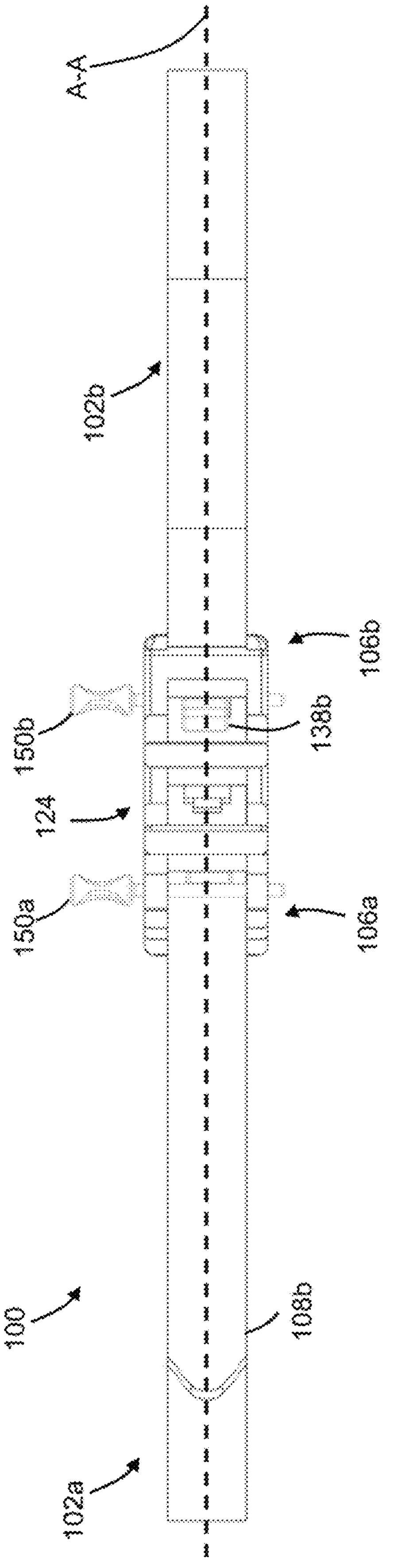
FIG. 3 is an elevation view of the restraint device of FIGS. 1-2.

As shown in FIG. 1, the ridge features 110*a*, 110*b* extend from the first end 106*a*, 106*b* to the second end 108*a*, 108*b*, along the entire face of one side of body 104*a*, 104*b* of wrist restraint 102*a*, 102*b*. The ridge features 110*a*, 110*b* may have a generally triangular cross section.

According to other embodiments, the ridge features 110*a*, 110*b* may extend only partway across the length of the body 104*a*, 104*b* of the wrist restraint 102*a*, 102*b*, or may be present on a different surface of wrist restraint 102*a*, 102*b*. According to various embodiments, the ridge features 110*a*, 110*b* may be undulations, sand type abrasives, teeth, or the like, having a high friction coefficient to provide a high friction surface for engaging with a ratchet mechanism or mechanical locking feature.

The first end 106*a*, 106*b* of the wrist restraints 102*a*, 102*b* comprises a first ratcheting mechanism 112*a*, 112*b*. Each wrist restraint 102*a*, 102*b* is configured such that the second end 108*a*, 108*b* of the wrist restraint 102*a*, 102*b* may be inserted into the first ratcheting mechanism 112*a*, 112*b* of the same wrist restraint 102*a*, 102*b* (i.e., the second end 108*a* is insertable into the first ratcheting mechanism 112*a* in the wrist restraint 102*a*; the second end 108*b* is insertable into the first ratcheting mechanism 112*b* in the wrist restraint 102*b*) to form a loop 120*a*, 120*b* for restraining a subject's hand/wrist.

The first ratcheting mechanism 112*a*, 112*b* comprises an aperture 114*a*, 114*b* having a pawl 116*a*, 116*b*, on an extension 118*a*, 118*b*. The extension 118*a*, 118*b* is mechanically biased such that at rest, the pawl 116*a*, 116*b* blocks the aperture 114*a*, 114*b*. An object that is to be engaged (such as second end 108*a*, 108*b*) may be inserted through the aperture 114*a*, 114*b*, displacing the biased extension 118*a*, 118*b*. The pawl 116*a*, 116*b* present on the biased extension 118*a*, 118*b* within the aperture 114*a*, 114*b* may then engage with the plurality of ridge features 110*a*, 110*b* present on each wrist restraint 102*a*, 102*b*, such that the second end 108*a*, 108*b* may be advanced further into the first ratcheting mechanism 112*a*, 112*b*, in one direction only, but may not be removed from the first ratcheting mechanism 112*a*, 112*b* by pulling second end 108*a*, 108*b* away from first ratcheting mechanism 112*a*, 112*b*.

When the second end 108*a*, 108*b* of the wrist restraint 102*a*, 102*b* is engaged with the first ratcheting mechanism 112*a*, 112*b*, the wrist restraint 102*a*, 102*b* forms a loop 120*a*, 120*b*, having a substantially circular opening with a variable circumference 122$a$, 122$b$. When the second end 108$a$, 108$b$ is engaged with the first ratcheting mechanism 112$a$, 112$b$, the second end 108$a$, 108$b$ extends through the first ratcheting mechanism 112$a$, 112$b$. The second end 108$a$, 108$b$ may be advanced further into the first ratcheting mechanism 112$a$, 112$b$, to reduce the circumference 122$a$, 122$b$ of the loops 120$a$, 120$b$.

Each wrist restraint 102$a$, 102$b$ of device 100 may be comprised of a semi-rigid polymer/flexible material, such as Nylon™ or polypropylene. It may be advantageous to use a material such as Nylon™ for weather and UV resistance. According to other embodiments, the wrist restraint 102$a$, 102$b$ may be comprised of other materials, including but not limited to steel, aluminum, other metallic materials, or any other material suitable for a wrist restraining device. Any example of wrist restraint 102$a$, 102$b$ may preferably be comprised of a material having a tensile strength of 300 lbs or more, to securely restrain a subject. Nylon™ polymers are advantageously recyclable, which promotes environmental sustainability.

In the embodiments shown in FIGS. 1-4, each wrist restraint 102$a$, 102$b$ may be manufactured by an injection molding process. Other suitable manufacturing processes may be used, such as 3D printing, other additive manufacturing processes, machining, casting or other methods of molding.

The bodies 104$a$, 104$b$ of the wrist restraints 102$a$, 102$b$ of the device 100 are of a certain size. In other examples, wrist restraints 102$a$, 102$b$ may be of any length, width or thickness that may securely restrain the wrists of a subject.

Restraint device 100 further includes cinching portion 124 for securing the wrists of the subject closer together. Cinching portion 124 has a cinching portion body 126, and a cinching ratcheting mechanism 128. Generally, the structure of the cinching ratcheting mechanism 128 is analogous to the mechanical structure of the first ratcheting mechanism 112$a$, 112$b$. In other embodiments, the structure of cinching ratcheting mechanism 128 may differ from the exact structure of first ratcheting mechanism 112$a$, 112$b$.

Cinching ratcheting mechanism 128 is configured to receive the second end 108$a$, 108$b$ of each wrist restraint 102$a$, 102$b$ simultaneously. Each second end 108$a$, 108$b$ passes through the cinching ratcheting mechanism 128 in opposing directions. The cinching ratcheting mechanism 128 comprises a pair of apertures 130$a$, 130$b$ through the cinching portion body 126, each aperture 130$a$, 130$b$ comprising a pawl 132$a$, 132$b$, on an extension 134$a$, 134$b$ that is mechanically biased such that at rest, the pawl 132$a$, 132$b$ blocks the aperture 130$a$, 130$b$. The second end 108$a$, 108$b$ is inserted through the aperture 130$a$, 130$b$, displacing the biased extension 134$a$, 134$b$. The pawl 132$a$, 132$b$ present on the biased extension 134$a$, 134$b$ within each aperture 130$a$, 130$b$ may engage then with the plurality of ridge features 110$a$, 110$b$ present on each wrist restraint 102$a$, 102$b$, resisting backwards movement of second end 108$a$, 108$b$ and consequently preventing the circumference of the loop 120$a$, 120$b$ of the wrist restraint 102$a$, 102$b$ from increasing.

An operator may form the first wrist restraint 102$a$ and second wrist restraint 102$b$ into a loop, by inserting second end 108$a$, 108$b$ of each wrist restraint 102$a$, 102$b$ into the first ratcheting mechanism 112$a$, 112$b$ of the same wrist restraint 102$a$, 102$b$. The second end 108$a$, 108$b$ may be pulled through the first ratcheting mechanism 112$a$, 112$b$, until the circumference 122$a$, 122$b$ is of a size that is acceptable to the operator. It may be advantageous to ensure that the circumference 122$a$, 122$b$ of each wrist restraint 102$a$, 102$b$ is generally larger that the width of a subject's hand to ensure later ease of insertion of a subject's hand. An operator may then insert the second end 108$a$, 108$b$ of each wrist restraint 102$a$, 102$b$, which is now protruding through first ratcheting mechanism 112$a$, 112$b$, into the cinching ratcheting mechanism 128. Preferably, the operator feeds the second end 108$a$, 108$b$ of each wrist restraint 102$a$, 102$b$ into the cinching ratcheting mechanism 128 until the cinching ratcheting mechanism 128 just engages second end 108$a$, 108$b$ of each wrist restraint 102$a$, 102$b$. This ensures that loops 120$a$, 120$b$ of each wrist restraint 102$a$, 102$b$ remain relatively separated from each other. Once the second end 108$a$, 108$b$ of both wrist restraints 102$a$, 102$b$ are engaged with the cinching ratcheting mechanism 128, cinching portion 124 is coupled to both wrist restraints 102$a$, 102$b$, forming device 100.

The operator may then use the device 100 to secure a subject's hands and wrists. In this example, a subject has a first wrist and second wrist. Once device 100 is formed by coupling the first wrist restraint 102$a$ and the second wrist restraint 102$b$ to the cinching portion 124, each wrist restraint 102$a$, 102$b$ may be deemed to be in the inserting configuration. The operator may then provide the device 100 to the subject for self-administration. The subject inserts their first wrist into the loop 120$a$ of the first wrist restraint 102$a$, and their second wrist into the loop 120$b$ of the second wrist restraint 102$b$. Once the subject's wrists are each placed into wrist restraint 102$a$, 102$b$, such that each wrist restraint 102$a$, 102$b$ substantially circumscribe each of the subject's wrists, the subject may then increase the distance between their wrists to transition the device 100 from the inserting configuration to the secure configuration.

When the subject increases the distance between their wrists, the section of the device 100 including the second end 108$a$ of the first wrist restraint 102$a$, the cinching portion 124 and the second end 108$b$ of the second wrist restraint 108$b$ becomes more taught. Once this section is taught, and the subject continues to increase the distance between their first wrist and second wrist, each wrist restraint 102$a$, 102$b$ of the device 100 begins to transition from the inserting configuration to the secure configuration, wherein the circumference 122$a$, 122$b$ of each wrist restraint 102$a$, 102$b$ begins to decrease. The circumference 122 of each wrist restraint 102$a$, 102$b$ decreases, such that the circumference 122$a$, 122$b$ of each wrist restraint 102$a$, 102$b$ substantially matches the circumference 122$a$, 122$b$ of each of the subject's wrists 102$a$, 102$b$. At this point, the circumference 122$a$, 122$b$ of each wrist restraint is smaller than the subject's hands, such that the subject may not remove their wrists from each wrist restraint 102$a$, 102$b$ without destroying or damaging wrist restraints 102$a$, 102$b$. The subject's wrists are now secured in wrist restraints 102$a$, 102$b$. The wrist restraints 102$a$, 102$b$ are configured such that a subject is unlikely to be able to damage, destroy or otherwise remove their wrists from wrist restraints 102$a$, 102$b$ without a tool, such as an edged blade, shears, snips, or other hard and/or sharp tool.

As shown in FIGS. 1-4, the device 100 may include a loosening mechanism 136$a$, 136$b$ on each wrist restraint, proximate to the first ratcheting mechanism 112$a$, 112$b$. Loosening mechanism may include an external lever 138$a$, 138$b$, wherein when the lever 138$a$, 138$b$ is engaged, the first ratcheting mechanism 112$a$, 112$b$ is disabled, such that first ratcheting mechanism 112$a$, 112$b$ does not engage the plurality of ridge features 110$a$, 110$b$ present on wrist restraint 102$a$, 102$b$. In the example of FIG. 1-4, engaging the lever 138$a$, 138$b$ comprises pushing the lever 138$a$, 138$b$ towards first end 106*a*, 106*b* of each wrist restraint 102*a*, 102*b*. Once first ratcheting mechanism 112*a*, 112*b* is disabled, each second end 108*a*, 108*b* may be retracted from each first ratcheting mechanism 112*a*, 112*b*, such that circumference 122*a*, 122*b* of each wrist restraint 102*a*, 102*b* may be increased. This may be advantageous in situations wherein circumference 122*a*, 122*b* of each wrist restraint 102*a*, 102*b* is decreased to a size such that the subject is in a state of discomfort or pain. Circumference 122*a*, 122*b* may be increased without destroying or damaging restraint device 100, reducing waste, and reducing the number of restraint devices 100 that an operator may need to carry during a security operation, law enforcement operation or other operation wherein an operator may be applying device 100 onto a subject, or providing device 100 to a subject for self-administration.

Once the subject's wrists are secured in each wrist restraint 102*a*, 102*b*, the subject may be instructed or forced to decrease the distance between their first wrist and second wrist (i.e., by bringing their restrained hands/wrists together). As the subject's wrists are moved together, the second end 108*a*, 108*b* of each wrist restraint 102*a*, 102*b* is forced further into the cinching ratcheting mechanism 128. As the cinching ratcheting mechanism 128 resists backwards movement of the second end 108*a*, 108*b* of each wrist restraint 102*a*, 102*b* out of the cinching ratcheting mechanism 128, once the subject's wrists are brought closer together, they may not be moved further apart, as this movement will be restricted by the cinching ratcheting mechanism 128. The subject's wrists are brought as close together as physically permissible, securing the subjects wrists together. The subject is now in a restrained position. The device 100 is configured such that a subject is unlikely to be able to damage, destroy or otherwise remove their wrists from wrist restraints 102*a*, 102*b*, or substantially increase the distance between their wrists, without a tool, such as an edged blade, shears, snips, or other hard and or sharp tool.

In examples wherein the device 100 comprises a loosening mechanism 136*a*, 136*b*, loosening mechanism 136*a*, 136*b* is not operational once subject's wrists are secured together, as any attempt to increase the circumference 122*a*, 122*b* of each wrist restraint 102*a*, 102*b* will result in first end 106*a*, 106*b* of each wrist restraint 102*a*, 102*b* physically interfering with cinching portion 124.

When it is determined that it is no longer necessary to restrain the subject's wrists using restraint the device 100, an operator may preferably use a sharp tool, such as shears or snips to break the circumference 112*a*, 122*b* of each loop 120*a*, 120*b* so that the subject may remove their wrists from the restraint device 100.

Figure 4:
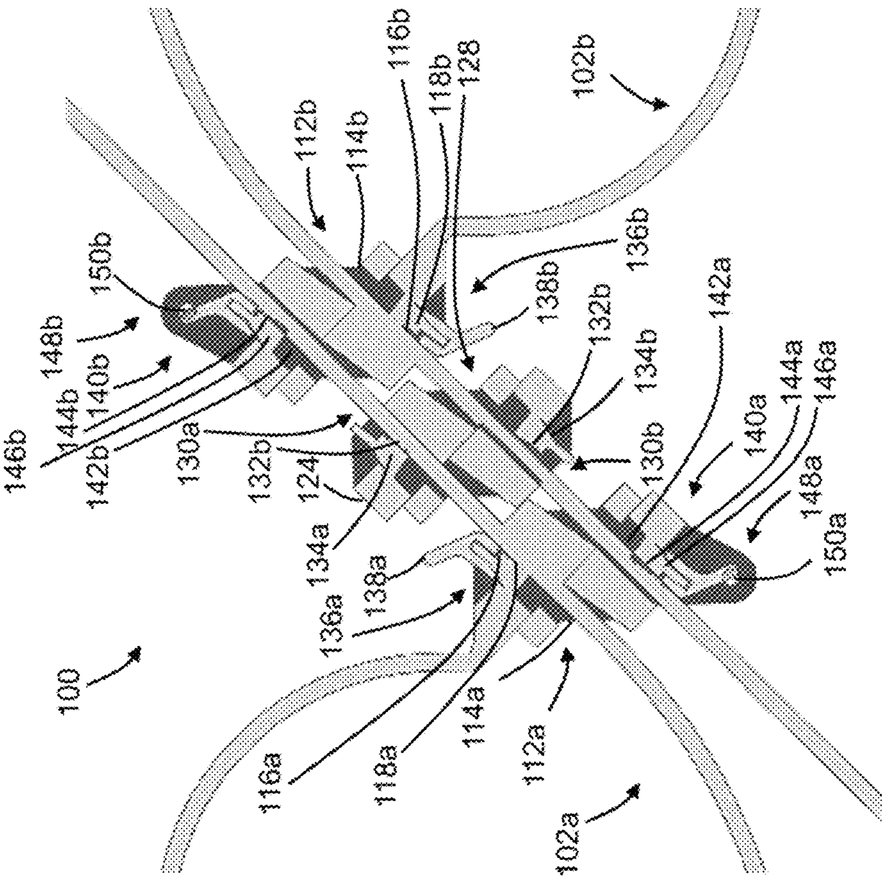
FIG. 4 is a cross sectional plan view of the restraint device of FIGS. 1-3, along section A-A of FIG. 3.

As shown in FIG. 4, each wrist restraint 102*a*, 102*b* further comprises a second ratcheting mechanism 140*a*, 140*b*. The second ratcheting mechanism 140*a*, 140*b* is generally similar in structure to the first ratcheting mechanism 112*a*, 112*b*. The second ratcheting mechanism 140*a*, 140*b* comprises an aperture 142*a*, 142*b*, comprising a pawl 144*a*, 144*b* on an extension 146*a*, 146*b* that is mechanically biased such that at rest, the pawl 144*a*, 144*b* blocks aperture 142*a*, 142*b*. An object that is to be engaged (such as second end 108*b*, 108*a*) may be inserted through the aperture 142*a*, 142*b*, displacing the biased extension 146*a*, 146*b*. The pawl 144*a*, 144*b* present on biased extension 146*a*, 146*b* within the aperture 142*a*, 142*b* may engage then with the plurality of ridge features 110*a*, 110*b* present on each wrist restraint 102*b*, 102*a*, such that second end 108*b*, 108*a* may be advanced further into the second ratcheting mechanism 140*a*, 140*b*, in one direction, but may not be removed from the second ratcheting mechanism 140*a*, 140*b* by pulling second end 108*b*, 108*a* away from second ratcheting mechanism 140*a*, 140*b*.

Each wrist restraint 102*a*, 102*b* further comprises a locking mechanism 148*a*, 148*b*. The locking mechanism 148*a*, 148*b* is configured such that the second ratcheting mechanism 140*a*, 140*b* may be engaged or disengaged, depending on whether the locking mechanism 148*a*, 148*b* is locked or unlocked. The locking mechanism 148*a*, 148*b* is deemed to be in a locked configuration when the second ratcheting mechanism 140*a*, 140*b* is engaged, and in an unlocked configuration when the second ratcheting mechanism 140*a*, 140*b* is disengaged.

The locking mechanism 148*a*, 148*b* comprises a pin 150*a*, 150*b* which when inserted, biases the internal components of the second ratcheting mechanism 140*a*, 140*b* such that the pawl 144*a*, 144*b* of the second ratcheting mechanism 140*a*, 140*b* cannot engage with the second end 108*b*, 108*a* of each wrist restraint 102*b*, 102*a*. This allows second end 108*b*, 108*a* to be inserted into or retracted out of second ratcheting mechanism 140*a*, 140*b* without substantial resistance. This may be deemed the unlocked configuration. When the pin 150*a*, 150*b* is removed, locking the locking mechanism 148*a*, 148*b*, second ratcheting mechanism 140*a*, 140*b* is engaged, such that when second end 108*b*, 108*a* is inserted into second ratcheting mechanism 140*a*, 140*b*, second end 108*b*, 108*a* may only be advanced further into the second ratcheting mechanism 140*a*, 140*b* in one direction only, but may not be removed from the second ratcheting mechanism 140*a*, 140*b* by pulling second end 108*b*, 108*a* away from second ratcheting mechanism 140*a*, 140*b*.

According to other embodiments, the locking mechanism 148*a*, 148*b* may take on different forms, including levers, switches, or the like, that may be engaged by an operator or subject, preferably without tools.

In examples wherein the device 100 is equipped with wrist restraints 102*a*, 102*b* comprising a second ratcheting mechanism 140*a*, 140*b*, an operator may form the first wrist restraint 102*a* and second wrist restraint 102*b* into a loop, by inserting second end 108*a*, 108*b* of each wrist restraint 102*a*, 102*b* into the first ratcheting mechanism 112*a*, 112*b* of the same wrist restraint 102*a*, 102*b*. The second end 108*a*, 108*b* may be pulled through the first ratcheting mechanism 112*a*, 112*b*, until the circumference 122*a*, 122*b* is of a size that is acceptable to the operator. It may be advantageous to ensure that the circumference 122*a*, 122*b* of each wrist restraint 102*a*, 102*b* is generally larger than the width of a subject's hand to ensure later ease of insertion of the subject's hand through the loop 120*a*, 120*b*. An operator may then insert the second end 108*a*, 108*b* of each wrist restraint 102*a*, 102*b*, which is now protruding through first ratcheting mechanism 112*a*, 112*b*, into cinching ratcheting mechanism 128. The operator may then pull second end 108*a*, 108*b* of each wrist restraint 102*a*, 102*b* through cinching portion 128, and then insert each second end 108*a*, 108*b* into second ratcheting mechanism 140*b*, 140*a* of the opposite wrist restraint 102*b*, 102*a*, such that second ratcheting mechanism 140*b*, 140*a* engages the second end 108*a*, 108*b* of each other wrist restraint 102*a*, 102, as pictured in FIGS. 1-4.

Once both the second ends 108*a*, 108*b* of both the wrist restraints 102*a*, 102*b* are engaged by the cinching ratcheting mechanism 128, and the second ratcheting mechanism 140*b*, 140*a*, the device 100 is formed.

The operator may then use the device 100 to secure a subject's hands and wrists. In this example, a subject has a first wrist and second wrist. Once the device 100 is formed by engaging the second end 108_a_, 108_b_ of both wrist restraints 102_a_, 102_b_ with the cinching ratcheting mechanism 128, and the second ratcheting mechanism 140_b_, 140_a_, wrist restraint 102_a_, 102_b_ is deemed to be in the inserting configuration. The operator may then provide the device 100 to the subject for self-administration. The subject may arrange the device 100 such that pins 150_a_, 150_b_ are facing the operator/away from the subject. The subject may insert their first wrist into the loop 120_a_ of first wrist restraint 102_a_, and second wrist into the loop 120_b_ of second wrist restraint 102_b_.

Once the subject's wrists are placed into wrist restraint 102_a_, 102_b_, such that each wrist restraint 102_a_, 102_b_ substantially circumscribe each of the subject's wrists, the subject may then move their wrists away from one another, increasing the distance between their wrists. When the subject increases the distance between their wrists, the section of the device 100 including the second end 108_a_ of the first wrist restraint 102_a_, the cinching portion 124 and the second end 108_b_ of the second wrist restraint 102_b_ becomes more taught. Once this section is taught, and the subject continues to increase the distance between their first wrist and second wrist, each wrist restraint of the device 100 begins to move from the inserting configuration to the secure configuration, wherein the circumference 122_a_, 122_b_ of each wrist restraint 102_a_, 102_b_ begins to decrease. The circumference 122_a_, 122_b_ of each wrist restraint 102_a_, 102_b_ decreases, such that the circumference 122_a_, 122_b_ of each wrist restraint 102_a_, 102_b_ substantially matches the circumference of each of the subject's wrists.

At this point, the circumference 122_a_, 122_b_ of each wrist restraint 102_a_, 102_b_ is smaller than the subject's hands, such that the subject may not remove their wrists from each wrist restraint 102_a_, 102_b_ without destroying or damaging the wrist restraints 102_a_, 102_b_. The subject's wrists are now secured in wrist restraints 102_a_, 102_b_.

Once the subject's wrists are secured in each wrist restraint 102_a_, 102_b_, the subject may be instructed or forced to decrease the distance between their first wrist and second wrist. As the subject's wrists are moved together, the second end 108_a_, 108_b_ of each wrist restraint 102_a_, 102_b_ is forced further into cinching ratcheting mechanism 128. As cinching ratcheting mechanism 128 resists backwards movement of the second end 108_a_, 108_b_ of each wrist restraint 102_a_, 102_b_ out of the cinching ratcheting mechanism 128, once the subject's wrists are brought closer together, they may not be moved further apart, as this movement will be restricted by cinching ratcheting mechanism 128. The subject's wrists are brought as close together as physically permissible, securing the subjects wrists together. The subject is now in a restrained position. The device 100 is configured such that a subject is unlikely to be able to damage, destroy or otherwise remove their wrists from wrist restraints 102_a_, 102_b_, or substantially increase the distance between their wrists, without a tool, such as an edged blade, shears, snips, or other hard and or sharp tool.

As the subject brough both of their wrists together, the second end 108_a_, 108_b_ of each wrist restraint 102_a_, 102_b_ is advanced through the second ratcheting mechanism 140_b_, 140_a_ of the other wrist restraint 102_b_, 102_a_ (i.e., the second end 108_b_ of the wrist restraint 102_b_ is passed through the second ratcheting mechanism 102_a_; the second end 108_a_ of the wrist restraint 102_a_ is passed through the second ratcheting mechanism 102_b_). The locking mechanism 148_a_, 148_b_ may now be locked, by removing both pins 150_a_, 150_b_ to engage the second ratcheting mechanism 140_a_, 140_b_ of each wrist restraint 102_a_, 102_b_. As a result, each wrist restraint 102_a_, 102_b_ is now double locked, such that the circumference 122_a_, 122_b_ of each wrist restraint 102_a_, 102_b_ may not be increased or decreased, and the cinching portion 124 securely couples each wrist restraint 102_a_, 102_b_ such that a subject's wrists are generally restrained together.

All embodiments of restraint device described herein are configured such that a subject may self-administer the restraint device 100. This provides a significant advantage. The subject may self-administer the restraint 100 to a comfortable level of tightness, under the supervision of an operator, such as a law enforcement officer. This reduces unnecessary discomfort for the subject. Self-administration promotes subject dignity, as some subjects may find the process of being restrained by an operator such as a law enforcement operator distasteful or humiliating.

Traditional locking steel handcuffs or current zip tie-based restraints require an operator to be at a close proximity to a subject while administering the wrist restraint. The subject may self-administer restraint device 100 described herein at a safe distance, promoting operator safety.

The restraint device 100 described herein provides a double locking feature through the second ratcheting mechanism 140_a_, 140_b_ and the locking mechanism 148_a_, 148_b_. Double locking feature locks the circumference 122_a_, 122_b_ of each loop 120_a_, 120_b_, such that the subject may not inadvertently overtighten the restraint after locking the circumference 122_a_, 122_b_. Double locking improves the safety and comfort of device 100 Existing disposable restraints, such as other zip-tie based restraints are often not capable of double locking.

Additionally, the polymer-based restraint device 100 described herein is more deformable than traditional locking steel handcuffs, which are often carried by law enforcement officers. This smoother, more flexible surface, promotes subject comfort.

Figure 5:
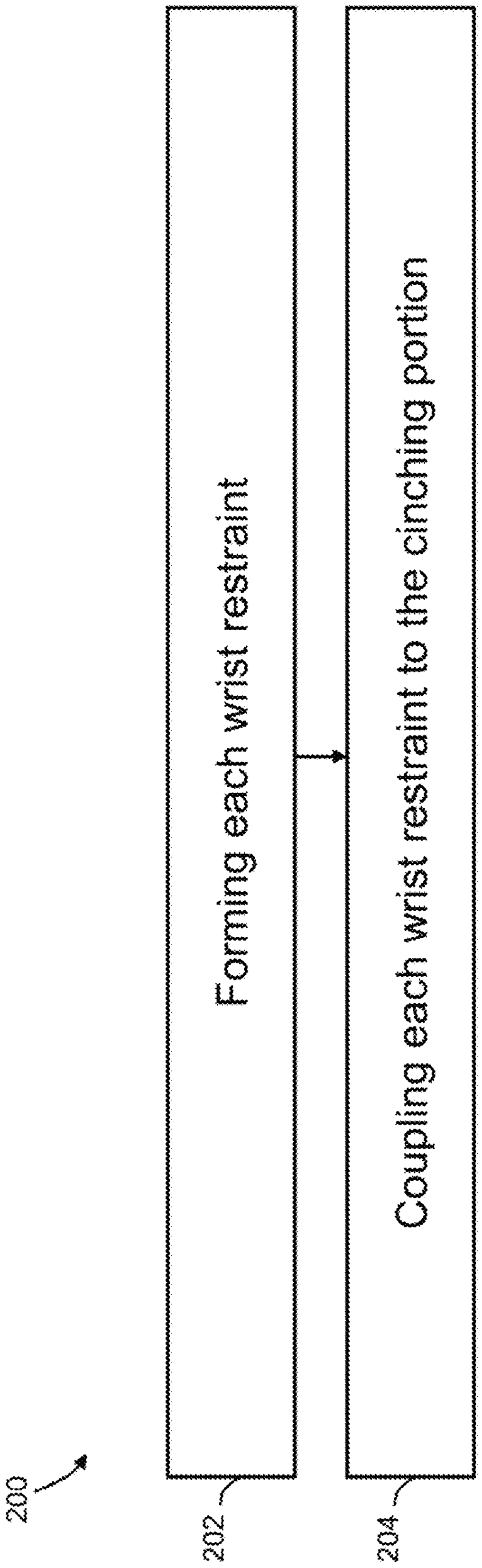
FIG. 5 is a flowchart depicting a method of using the restraint device of FIGS. 1-4.

Referring now to FIG. 5, pictured therein is a flow chart depicting a method 200 of operating the device 100 of FIGS. 1-4. The method 200 may be implemented using the device 100 shown in FIGS. 1-4.

Method 200 begins with step 202, wherein the second end 108_a_, 108_b_ of each wrist restraint 102_a_, 102_b_ is inserted into first ratcheting mechanism 112_a_, 112_b_ of the same wrist restraint 102_a_, 102_b_, to form each wrist restraint 102_a_, 102_b_ into a loop 120_a_, 120_b_ with a circumference 122_a_, 122_b_.

At step 204, each wrist restraint 102_a_, 102_b_ is coupled to the cinching portion 124 by inserting the second end 108_a_, 108_b_ of each wrist restraint 102_a_, 102_b_ into the cinching ratcheting mechanism 128. After the completion of step 204, the device 100 is in the inserting configuration and ready for a subject to self-restrain themselves using the device 100.

Figure 6:
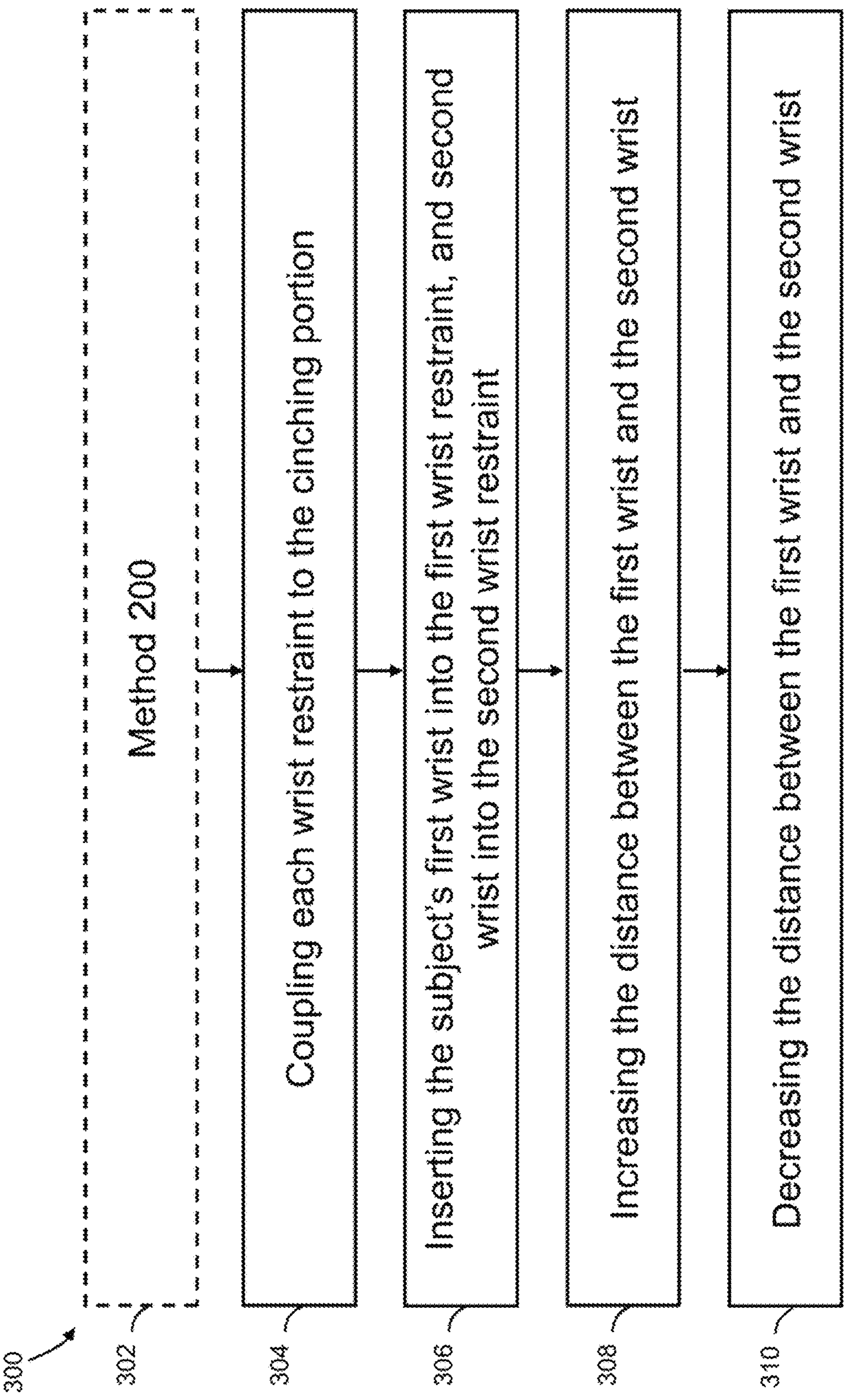
FIG. 6 is a flowchart depicting an alternative method of using the restraint device of FIGS. 1-4.

Referring now to FIG. 6, pictured therein is a flow chart depicting a method 300 of using the device 100 of FIG. 1-4. The method 300 may include any or all steps of the method 200 (step 302). The method 300 additionally comprises steps 304, 306, 308 and 310.

At step 304, the first wrist of a subject is inserted into the loop 120_a_ of first wrist restraint 102_a_ and the second wrist of a subject into the loop 120_b_ of second wrist restraint 102_b_.

At step 306, the first wrist of the subject is moved away from the second wrist of the subject. This action causes the second end 108_a_, 108_b_ of each wrist restraint 102_a_, 102_b_ to be pulled further through the first ratcheting mechanism 112_a_, 112_b_, such that the circumference 122_a_, 122_b_ of each wrist restraint 102_a_, 102_b_ is decreased, transitioning the wrist restraints 102_a_, 102_b_ from the inserting configuration to the secure configuration.

At step 308, the first wrist of the subject is moved towards the second wrist of the subject, to secure the subject's wrists. When the two wrists are moved together, the second end 108*a*, 108*b* are both inserted further into the cinching ratcheting mechanism 128, wherein the cinching ratcheting mechanism 128 resists backwards motion of second end 108*a*, 108*b*, such that the subject's wrists are secured to one another.

Figure 7:
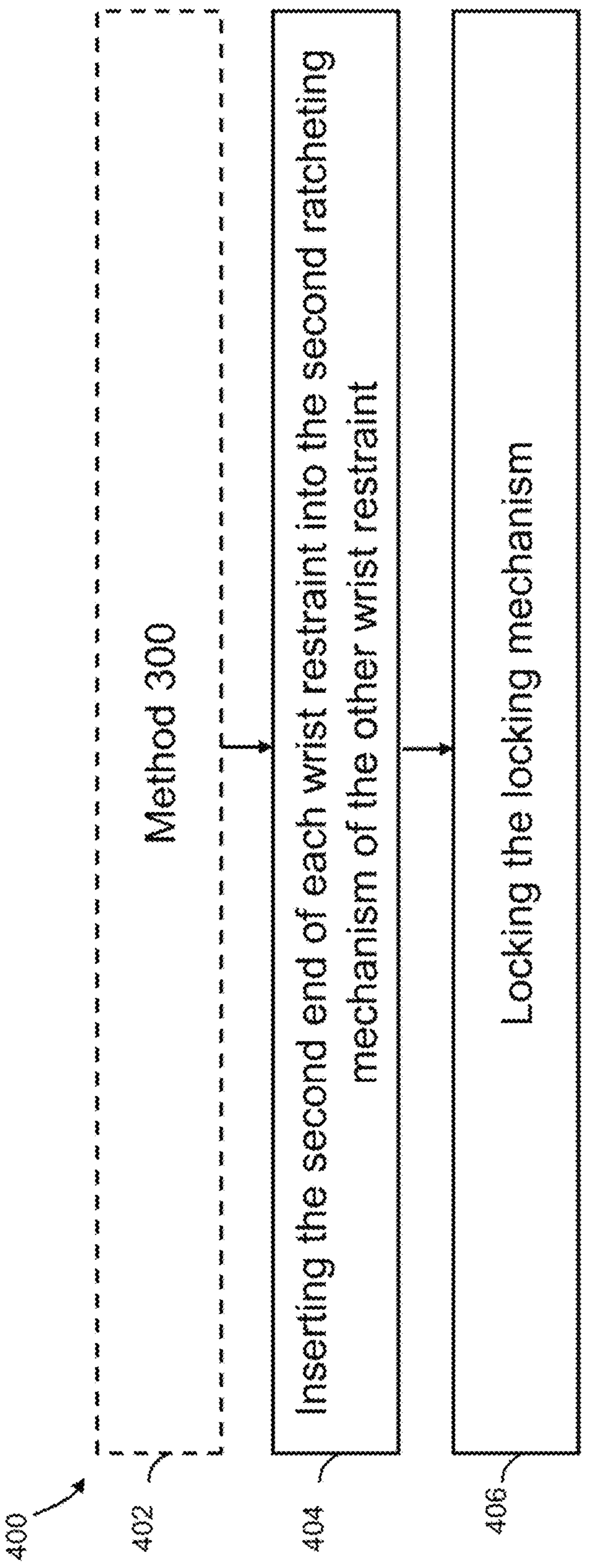
FIG. 7 is a flowchart depicting an alternative method of using the restraint device of FIGS. 1-4.

Referring now to FIG. 7, pictured therein is a flow chart depicting a method 400 of using the device 100 of FIG. 1-4. The method 400 may include any or all steps of the method 300 (step 402). Method 400 additionally comprises steps 404 and 406. Embodiments of the device 100 used to implement the method 400 additionally comprises second ratcheting mechanism 140*a*, 140*b*, and locking mechanism 148*a*, 148*b*.

At step 404, the second end 108*a*, 108*b* of each wrist restraint 102*a*, 102*b* is inserted into the second ratcheting mechanism 140*b*, 140*a* of the other wrist restraint 102*b*, 102*a*.

At step 406, the locking mechanism 148*a*, 148*b* of each wrist restraint is locked, such that the second ratcheting mechanism 140*a*, 140*b* is enabled. When the second ratcheting mechanism 140*a*, 140*b* is enabled, circumference 122*a*, 122*b* of each wrist restraint 102*a*, 102*b* is fixed.

In embodiments of the device 100 wherein the locking mechanism 148*a*, 148*b* comprises a pin 150*a*, 150*b*, locking the locking mechanism 148*a*, 148*b* comprises removing the pin 150*a*, 150*b*.

Figure 8:
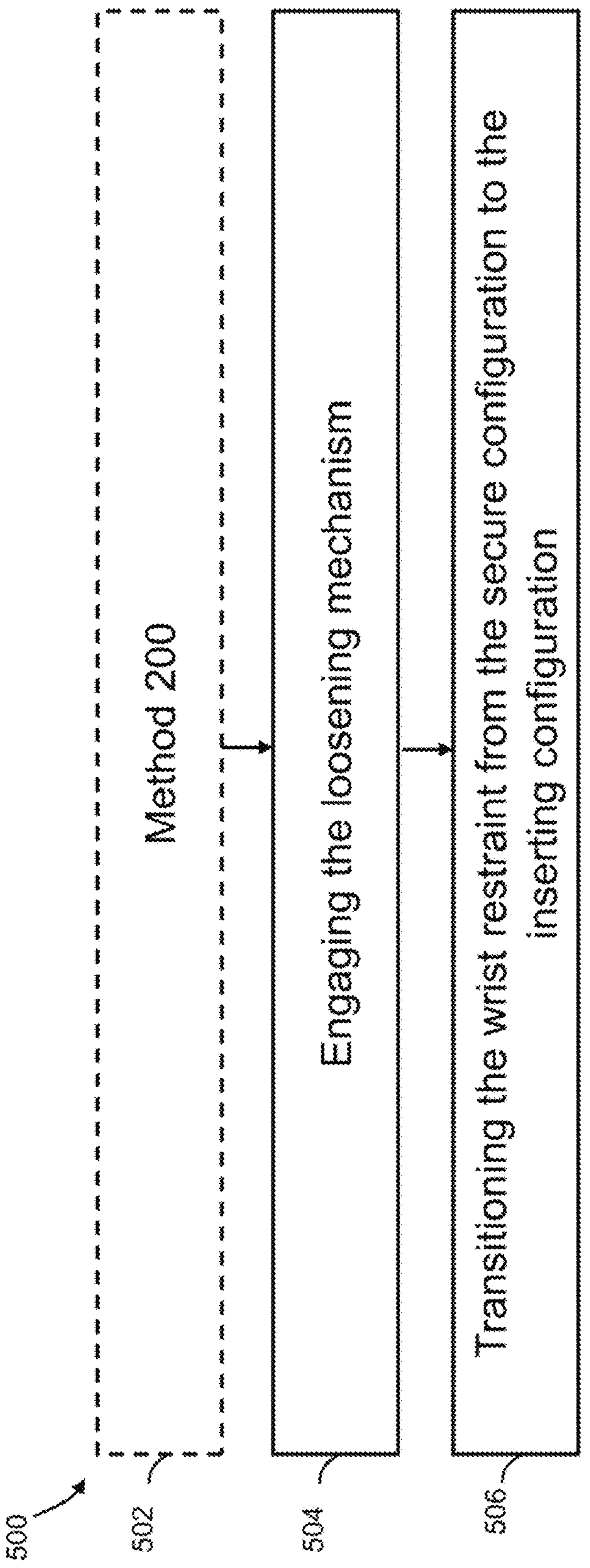
FIG. 8 is a flowchart depicting an alternative method of using the restraint device of FIGS. 1-4.

Referring now to FIG. 8, pictured therein is a flow chart depicting a method 500 of using the device 100 of FIG. 1-4. The method 500 may include any or all steps of method 200 (step 502). Method 500 additionally comprises steps 504 and 506. Embodiments of the device 100 used to implement the method 500 additionally comprises a loosening mechanism 148*a*, 148*b*.

At step 504, the loosening mechanism 148*a*, 148*b* is engaged, such that the first ratcheting mechanism 112*a*, 112*b* is disabled.

At step 506, the wrist restraint 102*a*, 102*b* is transitioned from the secure configuration to the inserting configuration. The circumference 122*a*, 122*b* of the loop 120*a*, 120*b* of each wrist restraint 102*a*, 102*b* may be increased during step 506. The wrist restraint 102*a*, 102*b* may be manually transitioned from the secure configuration to the inserting configuration by forcing the second end 108*a*, 108*b* back out of the first ratcheting mechanism 112*a*, 112*b*. A subject may require external assistance, for example, from an operator to transition from the secure configuration to the inserting configuration, as the subject's hands may be relatively constrained, and may not be able to apply force to the second end 108*a*, 108*b* in the necessary direction while constrained.

Figure 9:
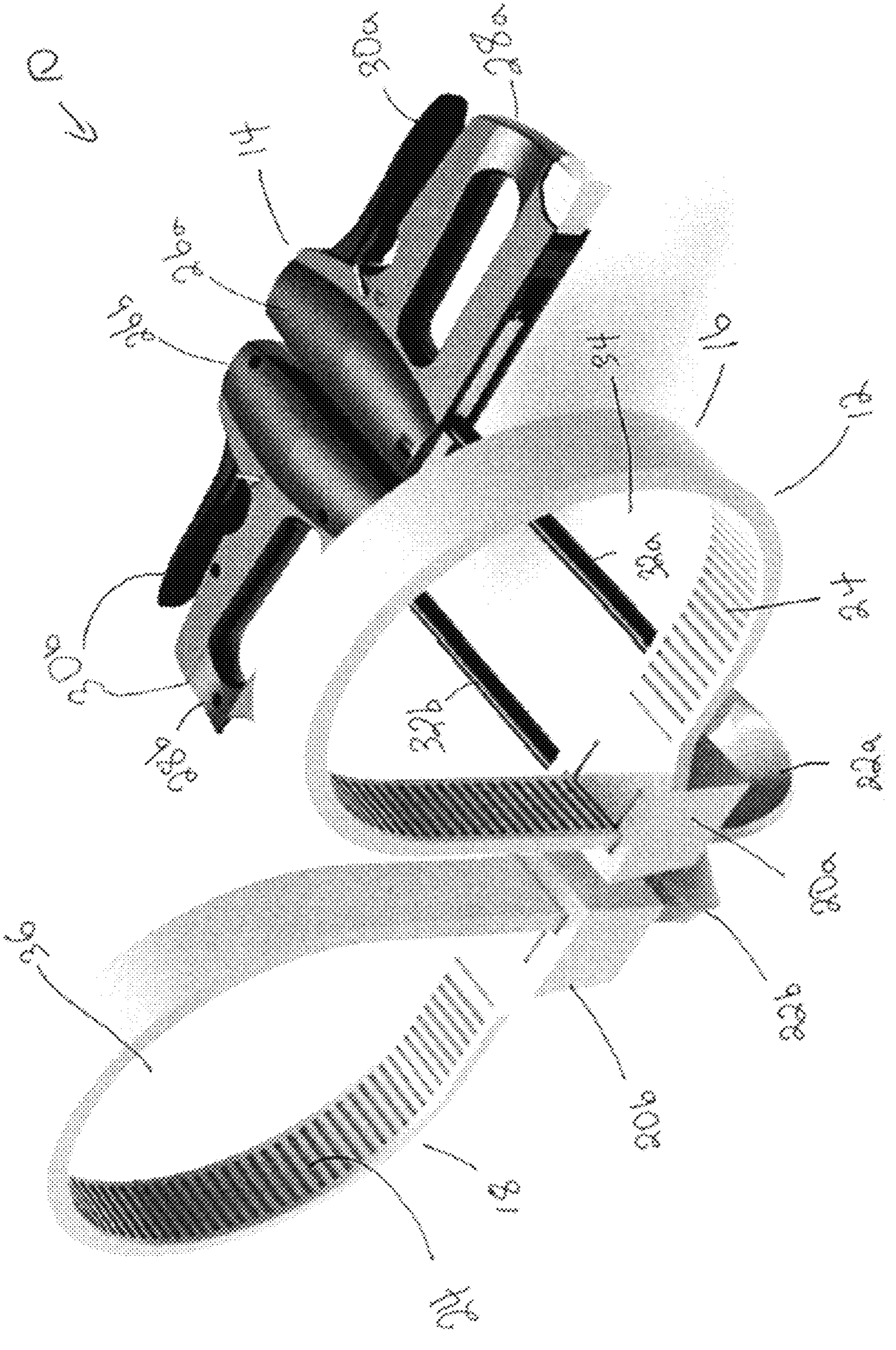
FIG. 9 is a perspective view of an alternative embodiment of a restraint device in the inserting configuration.

Referring now to FIG. 9, pictured therein is an alternate embodiment of a wrist restraint device. The restraint made in accordance with one aspect of the present invention is shown generally as item 10 and includes of a cuff portion 12 and a cinching portion 14 coupled to the cuff portion. In the present embodiment of the invention, cuff portion 12 includes a pair of wrist restraints 16 and 18 having first ends 20*a* and 20*b*, respectively second ends 22*a* and 22*b*, respectively. Wrist restraints 16 and 18 each have a plurality of ridges 24 and first ends 20*a* and 20*b* are formed as one way ratchets configured to engage ridges 24 in such a way as to permit wrist restraints 16 and 18 to be tightened but not loosened. Wrist restraints 16 and 18 and ends 20*a* and 20*b* are substantially formed as standard pull ties, but wider to restrain the subject's wrists more comfortably.

Cinching portion 14 includes of a pair of housings 26*a* and 26*b* which are coupled together. Housing 26*a* has a handle portion 28*a*, a member 30*a* and is coupled to a movable arm 32*a*. Movable arm 32*a* has a projecting end which is coupled to end 22*a* of wrist restraint 16. Housing 26*b* has a handle portion 28*b*, a member 30*b* and is coupled to a movable arm 32*b*. Movable arm 32*b* has a projecting end which is coupled to end 22*b* of wrist restraint 18. Contained in housings 26*a* is a ratchet mechanism coupled to movable arm 32*a* and member 30*a* which causes arm 32*a* to be retracted towards housing 26*a* when member 30*a* is repeatedly engaged. Likewise, housings 26*b* contains a ratchet mechanism coupled to movable arm 32*b* and member 30*b* which causes arm 32*b* to be retracted towards housing 26*b* when lever 30*b* is repeatedly engaged. Repeatedly engaging members 30*a* and 30*b* causes ends 22*a* and 22*b* to be pulled towards cinching portion 14 which in turn causes wrist restraint 16 and 18, respectively, to be constricted.

Figure 10:
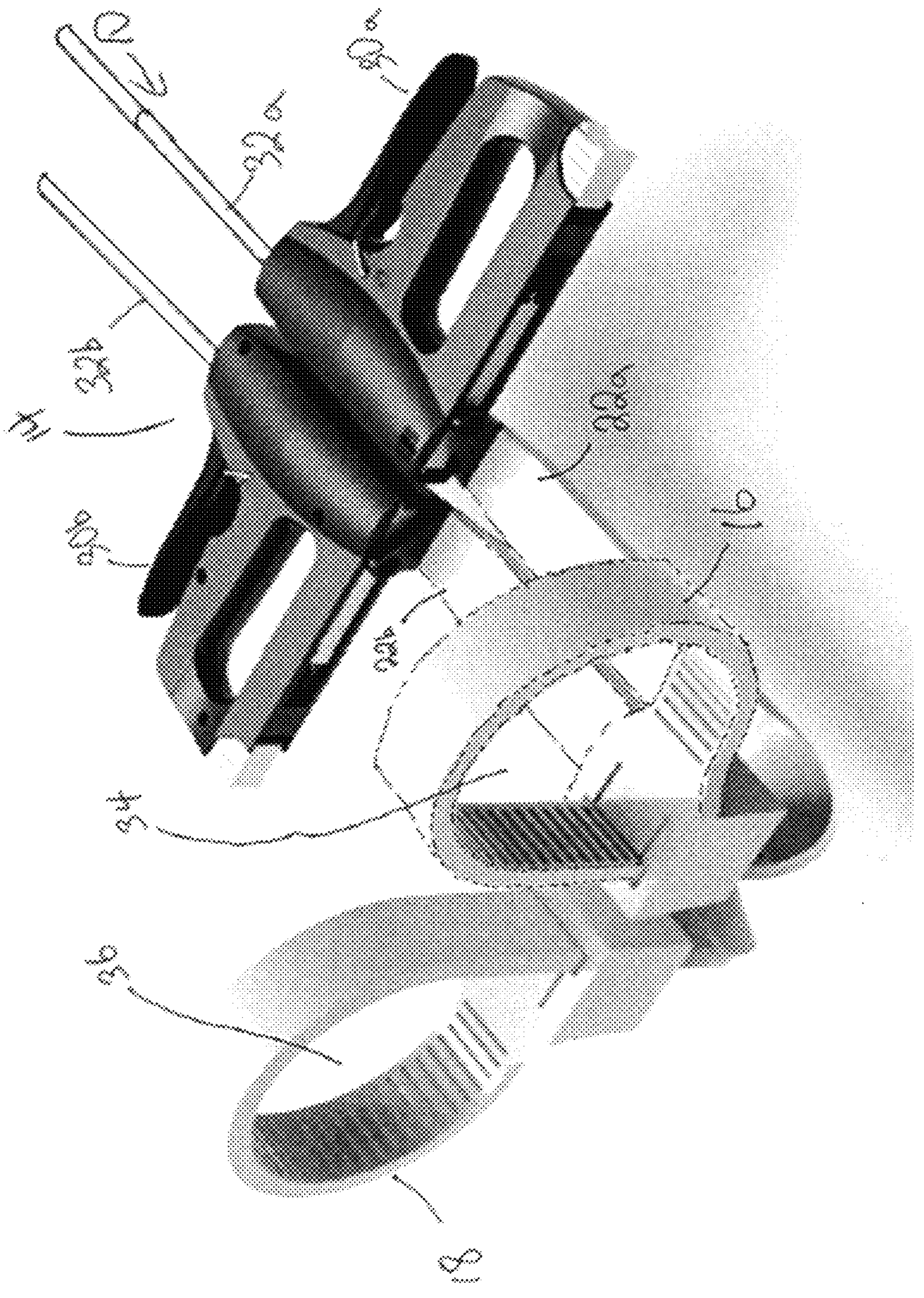
FIG. 10 is a perspective view of the restraint device of FIG. 9 in the secure configuration.
Figure 11:
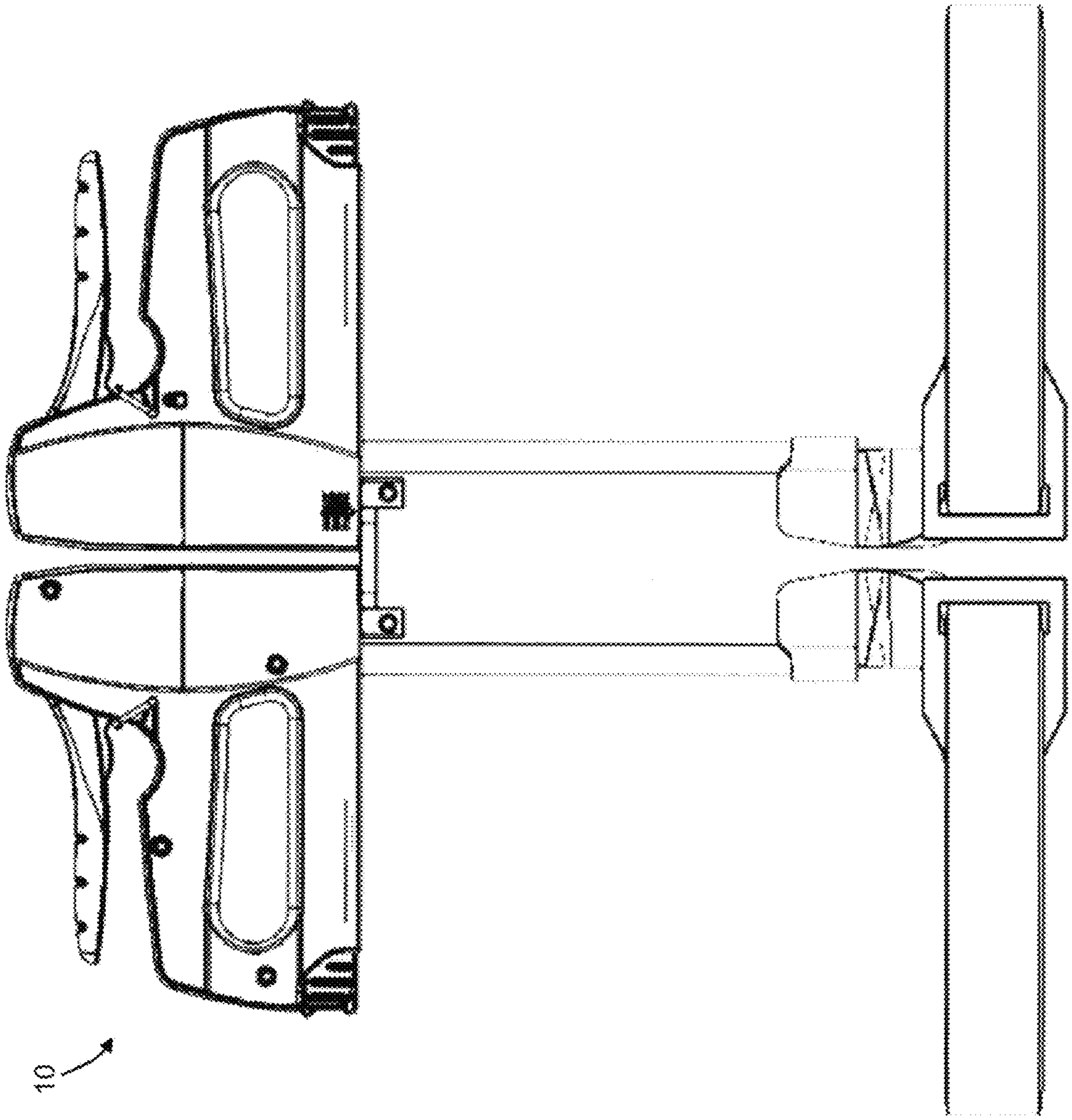
FIG. 11 is an elevation view of the restraint device of FIGS. 9-10.
Figure 12:
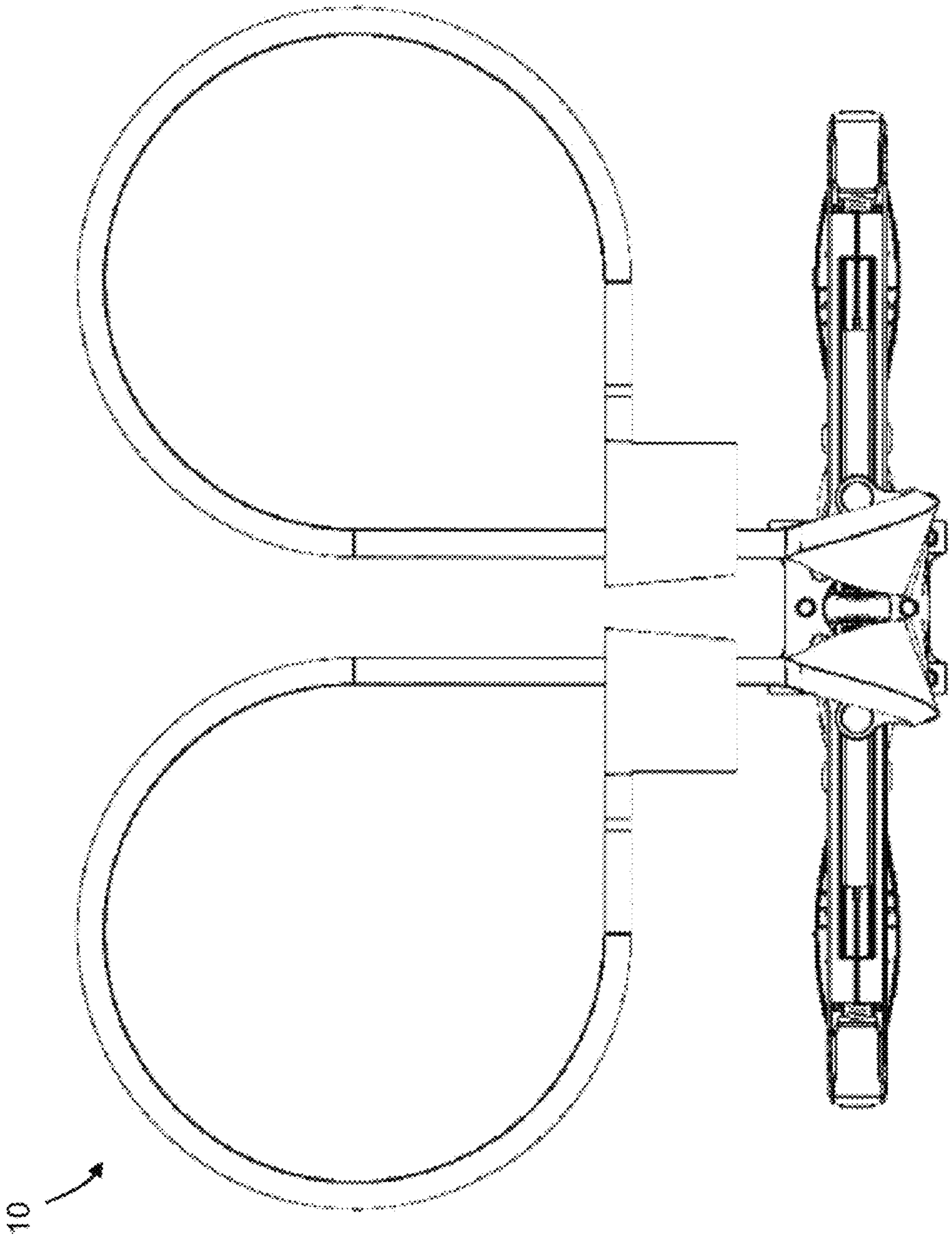
FIG. 12 is a plan view of the restraint device of FIGS. 9-11.
Figure 13:
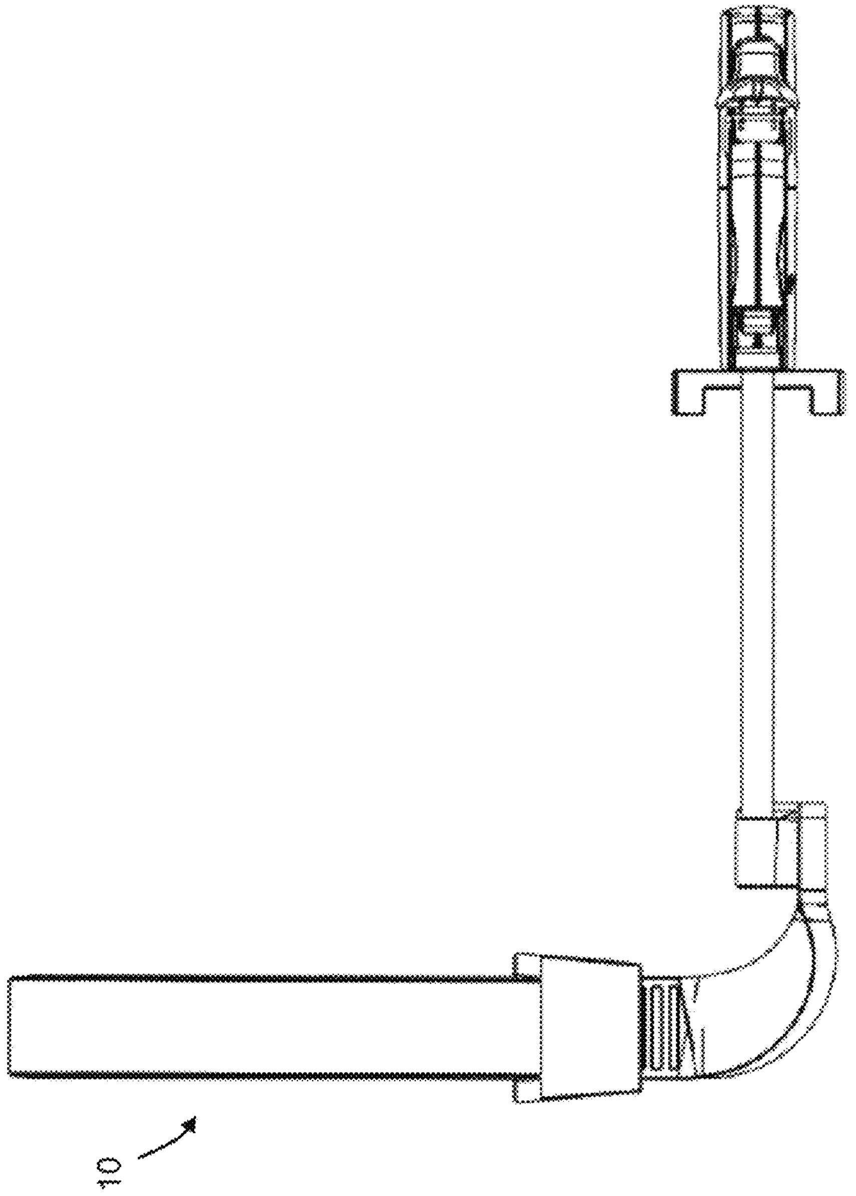
FIG. 13 is a side view of the restraint device of FIGS. 9-12.

Referring now to FIG. 10, as levers 30*a* and 30*b* are repeatedly engaged, ends 22*a* and 22*b*, respectively, are drawn towards cinching portion 14, and as a result loops 34 and 36 are made smaller (circumference decreases) as wrist restraints 16 and 18 are constricted. Ends 22*a* and 22*b* are preferably formed to be detachable from cinching portion 14 such that when wrist restraints 16 and 18 are constricted (moved from inserting configuration to secure configuration) they can be detached from the cinching portion.

Referring now to FIGS. 9 and 10, to use device 10, the subject (not shown) is instructed to insert his or her right hand and wrist (not shown) into loop 34 sufficiently to permit the user's right hand to grasp handle portion 28*a* and member 30*a*. The subject is likewise instructed to insert his or her left hand and wrist (not shown) into opening 36 sufficiently to permit the user's left hand to grasp handle portion 28*b* and member 30*b*. loops 34 and 36 are formed to be sufficiently large to permit the user to easily accomplish this task without struggling. When the subject's wrists are contained within loops 34 and 36 of wrist restraints 16 and 18, respectively, the subject is instructed to repeatedly engage members 30*a* and 30*b* in order to constrict (reduce circumference of) the wrist restraints. When the wrist restraints are constricted sufficiently such that the subject cannot remove his or her hands out of the wrist restraints, the subject can stop engaging the levers. The officer can then detach wrist restraints 16 and 18 from cinching portion 14. By allowing the subject to control the cinching of the wrist restraints, the subject can control the tightness of the wrist restraints on his or her wrists to the point where the wrists are secured, the hands are restrained but the restraint is still comfortable. The officer will be in attendance to ensure the restraints are tightened sufficiently to restrain the subject's hands securely.

Removing the wrist restraints can be achieved by simply cutting wrist restraints 16 and 18. To facilitate this, wrist restraints 16 and 18 are preferably made of a strong yet relatively soft and flexible material such as Nylon™. Wrist restraints 16 and 18 are preferably flat with ridges 24 formed on one of the flat side, it is possible to form the wrist restraints in any cross-sectional profile and the ridges can be placed on the side edges instead of on the flat sides.

The present embodiment proposes the use of flexible pull ties to restrain the subject's hands, but the invention is not limited to that specific embodiment. The hand restraints can include metal cuffs which are movable between an opened position (inserting configuration) wherein the subject can easily insert his/her hands into the cuffs and a constricted position (secure configuration) wherein the cuffs restrain the subject's wrists sufficiently to prevent removal of the hands from the cuffs. These metal cuffs will be coupled to a ratcheting mechanism analogous to cinching portion 14. The ratcheting mechanism will have a lever mechanism which can be repeatedly engaged to slowly tighten the cuffs. The ratcheting mechanism can be further configured to be detachably coupled to the metal cuffs. The principle of this metal cuff embodiment is the same as the embodiment shown in FIGS. 9 and 10, namely a means by which the subject himself/herself can tighten the wrist restraints into a locked orientation.

While the above description provides examples of one or more apparatus, methods, or systems, it will be appreciated that other apparatus, methods, or systems may be within the scope of the claims as interpreted by one of skill in the art. What is claimed is the systems and methods as generically and specifically described herein.

The invention claimed is:

1. A restraint device for securing the wrists of a subject, comprising:

a first wrist restraint and a second wrist restraint, each wrist restraint having a loop with a variable circumference, wherein each wrist restraint transitions between an inserting configuration, and a secure configuration, wherein the circumference of the loop in the inserting configuration is greater than the circumference of the loop in the secure configuration; and a cinching portion couplable to each wrist restraint to removably attach the first wrist restraint and the second wrist restraint, wherein the restraint device transitions from the inserting configuration to the secure configuration upon increasing a distance between a first wrist of the subject circumscribed by the loop of the first wrist restraint, and a second wrist of the subject circumscribed by the loop of the second wrist restraint such that a second end of each wrist restraint is pulled through the clinching portion.

2. The device of claim 1, wherein each wrist restraint comprises:

a first end comprising a first ratcheting mechanism; and the second end insertable into the first ratcheting mechanism to form the loop of each wrist restraint;

wherein the first ratcheting mechanism is configured to only decrease the circumference of the loop to transition the restraint device from the inserting configuration to the secure configuration.

3. The device of claim 2, wherein the cinching portion comprises a cinching ratcheting mechanism through which the second end of each wrist restraint is passed in opposing directions such that the second end of each wrist restraint may only advance through the cinching ratcheting mechanism in one direction once engaged by the cinching ratcheting mechanism.

4. The device of claim 3, wherein the first end of each wrist restraint further comprises a second ratcheting mechanism, configured to receive the second end of the other wrist restraint.

5. The restraint of claim 4, wherein each wrist restraint further comprises a locking mechanism, wherein each second ratcheting mechanism may be enabled by locking the locking mechanism, fixing the circumference of each loop when the second end of each wrist restraint is inserted into the second ratcheting mechanism of the other wrist restraint.

6. The restraint of claim 5, wherein each locking mechanism comprises a pin, wherein removing the pin locks the locking mechanism.

7. The restraint of claim 5, wherein each wrist restraint is constructed of a semi-rigid polymer material.

8. The restraint of claim 5, wherein each wrist restraint is constructed of metal.

9. The restraint of claim 3, wherein each wrist restraint further comprises a loosening mechanism, wherein when each loosening mechanism is engaged, each first ratcheting mechanism is disabled, such that each wrist restraint may be transitioned from the secure configuration to the inserting configuration.

10. A method of operating a restraint device of claim 3, the method comprising the steps of:

forming the loop of each wrist restraint by inserting the second end of each wrist restraint into the first ratcheting mechanism of the same wrist restraint; and coupling each wrist restraint to the cinching portion by inserting the second end of each wrist restraint into the cinching ratcheting mechanism, thereby placing the restraint device in the inserting configuration.

11. The method of claim 10, further comprising:

inserting the first wrist of the subject into the loop of the first wrist restraint, and inserting the second wrist of the subject into the loop of the second wrist restraint;

increasing the distance between the first wrist and the second wrist to transition the restraint device to the secure configuration; and decreasing the distance between the first wrist and second wrist to secure the subject's wrists.

12. The method of claim 11, wherein the device further comprises:

a second ratcheting mechanism at the first end of each wrist restraint, wherein the second ratcheting mechanism of each wrist restraint is configured to receive the second end of the other wrist restraint; and a locking mechanism, wherein the second ratcheting mechanism may be enabled by locking the locking mechanism, fixing the circumference of each wrist restraint;

wherein the method further comprises:

inserting the second end of each wrist restraint into the second ratcheting mechanism of the other wrist restraint; and locking the locking mechanism to fix the circumference of each wrist restraint.

13. The method of claim 12, wherein each locking mechanism comprises a pin, wherein locking the locking mechanism comprises removing each pin.

14. The method of claim 13, wherein each pin when removed, mechanically biases the second ratcheting mechanism such that the second ratcheting mechanism cannot engage the second end of the wrist restraint.

15. The method of claim 11, wherein each wrist restraint further comprises:

a loosening mechanism, wherein when each loosening mechanism is engaged, each first ratcheting mechanism is disabled;

wherein the method further comprises:

engaging the loosening mechanism to disable the first ratcheting mechanism;

transitioning the wrist restraint from the secure configuration to the inserting configuration.

16. A restraint device for securing the hands and wrists of a subject having a first and a second wrist, the restraint device comprising:

a first wrist restraint and a second wrist restraint, each wrist restraint having a loop with a circumference, wherein each wrist restraint comprises an inserting configuration, and a secure configuration, wherein the circumference of the inserting configuration is greater than the circumference of the secure configuration;

a cinching portion coupled to each wrist restraint, the cinching portion configured such that while the subject's first wrist contained within the loop of the first wrist restraint and the subject's second wrist is contained within the loop of the second wrist restraint, the subject may repeatedly engage a member of the cinching portion to transition each wrist restraint from the inserting configuration to the secure configuration.

* * * * *